(12) United States Patent
Levy

(10) Patent No.: US 12,724,932 B2
(45) Date of Patent: Sep. 1, 2026

(54) CRAM VALIDATION USING AN EXTERNAL DEVICE

(71) Applicant: XILINX, INC., San Jose, CA (US)

(72) Inventor: Paul S. Levy, Albuquerque, NM (US)

(73) Assignee: XILINX, INC., San Jose, CA (US)

( * ) Notice: Subject to any disclaimer, the term of this patent is extended or adjusted under 35 U.S.C. 154(b) by 184 days.

(21) Appl. No.: 18/595,289

(22) Filed: Mar. 4, 2024

(65) Prior Publication Data

US 2025/0278525 A1 Sep. 4, 2025

(51) Int. Cl.
*G06F 21/79* (2013.01)
*G06F 21/60* (2013.01)
*H04L 9/32* (2006.01)

(52) U.S. Cl.
CPC ............ *G06F 21/79* (2013.01); *G06F 21/602* (2013.01); *H04L 9/3271* (2013.01)

(58) Field of Classification Search
CPC ........ G06F 21/64; G06F 21/645; G06F 21/76; G06F 21/79; G06F 21/602; G06F 12/14; G06F 12/1408; H04L 9/3271
See application file for complete search history.

(56) References Cited

U.S. PATENT DOCUMENTS 8,909,941 B1 * 12/2014 Trimberger ............ G06F 21/64 713/193
2018/0060561 A1 * 3/2018 Pedersen ................ G06F 21/44
2018/0239665 A1 * 8/2018 Hutton ................ G06F 11/0751
2018/0337789 A1 * 11/2018 Lewis .................. H04L 9/3271
2019/0050604 A1 * 2/2019 Weber .................... G06F 21/76
2021/0232396 A1 * 7/2021 Arsanto ................ G06F 9/3016
2022/0276783 A1 * 9/2022 Kang .................... G06F 3/0616
2023/0082529 A1 * 3/2023 Uezono ............ H03K 19/17764 714/764
2024/0195639 A1 * 6/2024 Silverman ............ H04L 9/3271

OTHER PUBLICATIONS

Bjerregaard, Michael L., "Using JTAG for External Scrubbing on the AMD Versal ACAP," Theses and Dissertations, BYU ScholarsArchive, Dec. 6, 2023.
Stoddard, A,, et al., "A Hybrid Approach to FPGA Configuration Scrubbing," in IEEE Transactions on Nuclear Science, vol. 64, No. 1, pp. 497-503, Jan. 2017.
Stoddard, Aaron Gerald, "Configuration Scrubbing Architectures for High-Reliability FPGA Systems," Theses and Dissertations, BYU ScholarsArchive, Dec. 1, 2015.

* cited by examiner

*Primary Examiner* — Jeremy S Duffield
(74) *Attorney, Agent, or Firm* — Patterson + Sheridan, LLP

(57) ABSTRACT

Embodiments herein describe CRAM validation using an external device (ED). The ED selects unused addresses of CRAM as challenge registers (CRs), determines challenge bits for the CRs, and provides the selected addresses and the challenge bits to challenge circuitry of the IC device. The challenge circuitry initiates storage of the challenge bits at the selected CRAM addresses and invokes scan circuitry to scan the CRAM. The scan circuitry retrieves contents of CRAM addresses used to store configuration bits and contents of the selected CRAM addresses, and provides the contents or a code determined from the contents to the challenge circuitry (i.e., bypassing validation circuitry of scan logic). The challenge circuitry forwards the contents or the code to the ED as a challenge response, and the ED validates the CRAM based on the challenge response and a golden copy of the configuration bits.

14 Claims, 10 Drawing Sheets

900
902
INT 911
CLE 912
920
922
924
903 or 906
INT 911
DSPL 914
or
BRL 913
904
IOL 915
Configuration/Clock Distribution 909
MGTs 901
CLBs 902
BRAMs 903
IOBs 904
Processor 910
Config/Clocks 905
DSPs 906
Analog Circuits 950
907
908

CRAM VALIDATION USING AN EXTERNAL DEVICE

TECHNICAL FIELD

Examples of the present disclosure generally relate to programmable integrated circuit devices and, more particularly, to validation of configuration random access memory (CRAM) using an external device.

BACKGROUND

An integrated circuit (IC) device may include programmable elements and configuration read-only memory (CRAM). Functionality of the programmable elements is controlled by configuration bits stored in the CRAM. Changes to the configuration bits stored in the CRAM may alter, disrupt, and/or disable functionality of the IC device. Such changes may occur unintentionally (i.e., bit-flips) due to environmental factors such as temperature, age, power fluctuations, ionizing radiation, and/or other factors. Changes may also occur due to intentional/malicious actions (e.g., of a state actor). In order to detect changes in configuration bits, the IC device may further include scan logic that periodically scans (i.e., reads) the CRAM, validates contents of the CRAM (e.g., based on an original/golden copy of the configuration bits), and reports pass/fail results. The scan logic may, however, be susceptible to man-in-the-middle attacks to conceal malicious alterations.

SUMMARY

Techniques for validating configuration random access memory (CRAM) using an external device are described. One example is an integrated circuit (IC) device, that includes CRAM, circuitry that is configurable based on configuration bits stored in the CRAM, scan circuitry that retrieve contents of the CRAM, and challenge circuitry that receives designated CRAM addresses and challenge bits from an external device, initiates storage of the challenge bits at respective ones of the designated CRAM addresses, invokes the scan circuitry to retrieve the contents of the CRAM, receives a challenge response from the scan logic, and provides the challenge response to the external device, where the challenge response includes one or more of the retrieved contents of the CRAM and a response code determined based on the retrieved contents of the CRAM.

Another example described herein is an IC device that includes CRAM, circuitry and interconnects that are configurable based on configuration bits stored in the CRAM, and scan circuitry that retrieves contents of the CRAM. The scan circuitry includes validation circuitry that determines whether the retrieved contents of the CRAM match an original version of the configuration bits and outputs a validation decision, in a first mode. The scan circuitry further includes bypass circuitry configured to bypass the validation circuitry and output a challenge response in a second mode, where the challenge response includes one or more of the retrieved contents of the CRAM and a response code determined based on the retrieved contents of the CRAM.

Another example described herein is a computing platform that selects addresses of CRAM of a programmable integrated circuit (IC) device that are not used to store configuration bits to serve as challenge registers, determines challenge bits for the challenge registers, provides the selected addresses and the challenge bits to the IC device, receives a challenge response from the IC device, and selectively validates the CRAM based on an original version of the configuration bits, the challenge bits, and the challenge response.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
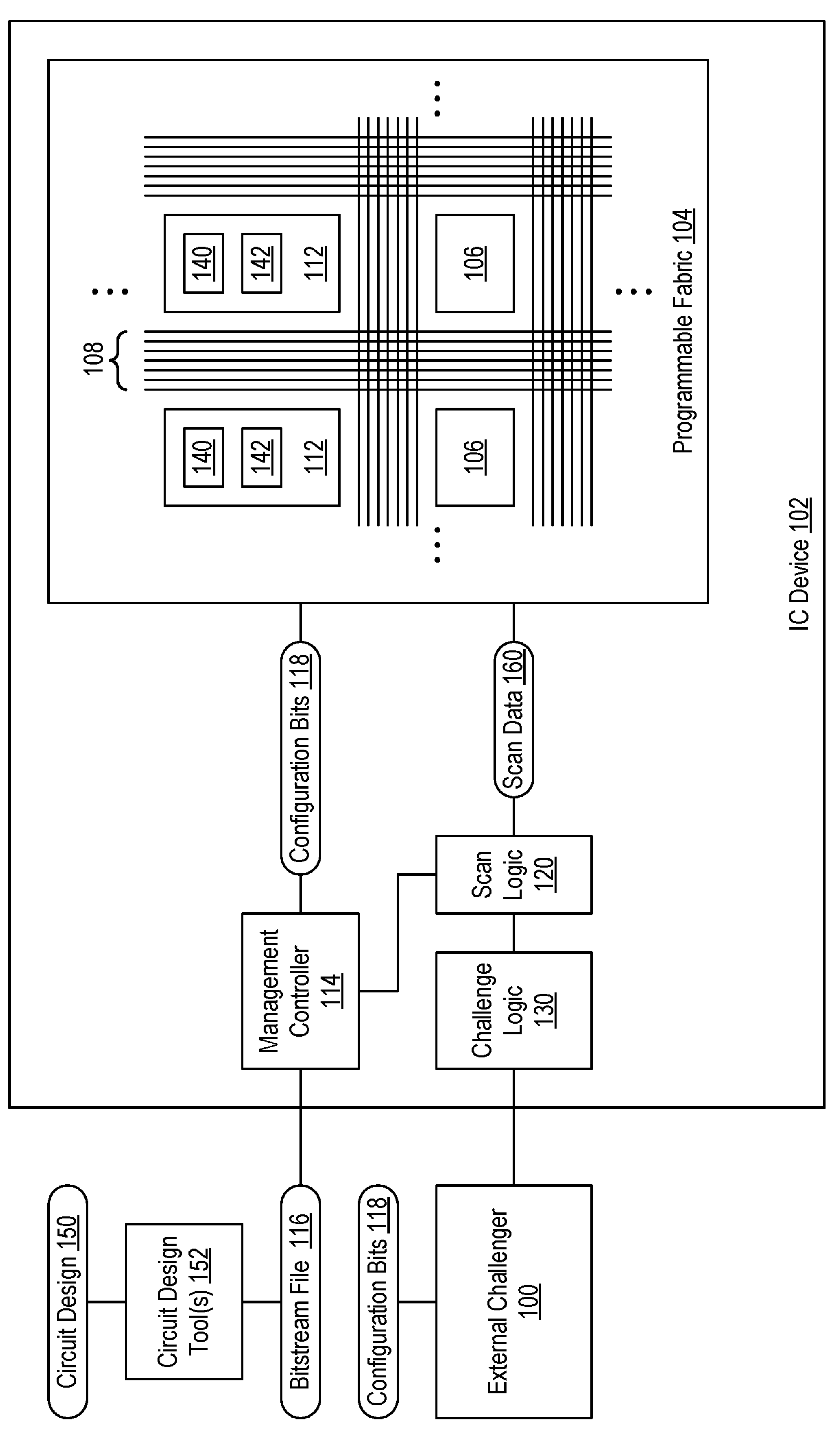
FIG. 1 is a block diagram of an integrated circuit (IC) device and a computing platform configured as an external challenger for validating configuration bits stored in configuration random-access memory (CRAM) of the IC device, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for validating configuration random-access memory (CRAM) using an external device.

An integrated circuit (IC) device, such as a system-on-chip (SoC) may include programmable elements (e.g., programmable logic and programmable interconnects) and configuration memory, which may be collectively referred to as programmable logic (PL), a field-programmable gate array (FPGA), a programmable fabric, or a fabric. Functionality of the fabric is controlled by configuration bits stored in the configuration memory, which may also be referred to as configuration registers, and/or configuration read-only memory (CRAM).

A circuit design may be converted into a bitstream file that contains configuration bits for configuring the fabric to implement the circuit design. The bitstream file is specific to the circuit design and the IC device. The configuration bits may be loaded into the configuration memory during a boot-phase of the IC device, and are intended to remain unchanged (i.e., static) while the IC device is powered-up.

Depending upon the circuit design, not all of the CRAM will contain configuration bits. Portions of the CRAM that contain configuration bits may be referred to as CRAM, static configuration registers, and/or static configuration memory. Portions of the CRAM that do not contain configuration bits may serve as dynamic memory for the circuit design (e.g., to store state information of a state machine), and/or may be unused, and may referred to collectively as dynamic CRAM, dynamic configuration registers, and/or dynamic configuration memory. Static and dynamic CRAM may be distributed throughout the fabric, and may vary amongst circuit designs.

Changes to configuration bits in static CRAM may alter, disrupt, and/or disable functionality of the implemented circuit design within the fabric. Such changes may occur unintentionally (i.e., bit-flips) due to environmental factors such as temperature, age, power fluctuations, ionizing radiation, and/or other factors. Changes may also occur due to intentional/malicious actions (e.g., of a state actor).

In order to detect changes in configuration bits, the IC device may further include scan logic that periodically scans (i.e., reads) static CRAM, validates contents of the static CRAM (e.g., compares the scan results to an original or golden copy of the configuration bits), and reports pass/fail results. In an example, the scan logic computes a response code based on scan results, and compares the response code to a golden code computed from the golden copy of the configuration bits. The scan logic may, however, be susceptible to a man-in-the-middle attack. As an example, where a malicious actor alters configuration bits stored in the CRAM, the malicious actor may also intercept scan results returned to the scan logic and inject the golden copy of the configuration bits, and/or may replace the golden code with a code that will match the scan results, and/or may replace the validation decision with a pass indication. The IC device may further include logic designed to preclude man-in-the-middle attacks, but such logic may, itself, be susceptible to malicious attacks.

Techniques for validating CRAM using an external device, as disclosed herein, may be less susceptible and/or impervious to malicious attacks, such as man-in-the middle attacks.

In an example, CRAM of an IC device is programmed with configuration bits of a bitstream file, and an external challenger (e.g., a computing platform), dynamically selects unused locations/addresses of the CRAM, generates challenge bits for the selected locations, provides the challenge bits and the selected addresses to the IC device, and constructs a challenge bitstream based on the configuration bits of the bitstream file and the challenge bits. The external challenger may also compute a reference code based on the challenge bitstream (e.g., with a hash function).

Challenge logic of the IC device then initiates/invokes a procedure in which the challenge bits are stored in the selected locations of the CRAM and scan logic of the IC devices scans static CRAM and the selected addresses of the CRAM that contain the challenge bits. The scan logic may ignore and/or discard contents of other addresses of the configuration memory (i.e., dynamic configuration memory used by the circuit design). Alternatively, the scan logic may treat contents of the other addresses as all zeros or all ones. The scan logic may return raw scan results to the challenge logic and/or may compute a response code based on the scan results (e.g., with the hash function used by the external challenger), and return the response code to the challenge logic. In other words, validation logic of the scan logic is bypassed or disabled during an external CRAM challenge.

The challenge logic may return the response code or the raw bits to the external challenger as a challenge response, and the external challenger may compare the challenge response to the challenge bitstream or to the reference code determined from the challenge bitstream. The challenge bits, the selected CRAM, and/or the challenge response may be access-protected (e.g., with encryption and/or hardware based access-restrictions), within the external challenger, within the IC device, and/or in transit between the external challenger and the IC device.

FIG. 1 is a block diagram of an IC device 102 and an external challenger 100 that validates configuration bits stored in configuration random access memory (CRAM) of IC device 102, according to an embodiment. External challenger 100 may include logic circuitry and/or a processor and memory containing instructions for execution by the processor.

IC device 102 includes programmable/configurable elements, illustrated here as a programmable fabric (fabric) 104. Fabric 104 may represent and/or include a field-programmable gate array (FPGA). In the example of FIG. 1, fabric 104 includes configurable logic 106, interconnects 108, and configuration random access memory (CRAM) 112. CRAM 112 may also be referred to as configuration memory and/or configuration registers. Configurable logic 106 may include, without limitation, non-sequential logic elements (e.g., AND, NAND, OR, NOR, XOR, and/or other types of logic gates), and/or sequential logic elements (e.g., flip-flops).

IC device 102 further includes a management controller 114 and/or other logic that programs or configures elements of fabric 104 based on configuration bits 118 of a bitstream file 116. In an example, a circuit design tool 152 converts a circuit design 150 to bitstream file 116 based on elements of fabric 104. Bitstream file 116 is thus specific to circuit design 150 and fabric 104. Circuit design tool 152 may represent multiple circuit design tools.

Management controller 114 stores configuration bits 118 in CRAM 112. Configuration bits 118 stored in CRAM 112 determine which logic elements of fabric 104 are enabled, and determine interconnection amongst the logic elements. Management controller 114 may load/store configuration bits 118 in CRAM 112 at boot-up (e.g., when power is applied to IC device 102). Management controller 114 may reconfigure fabric 104 based on other bitstream files.

Not all memory cells of CRAM 112 contain configuration bits. Portions of CRAM 112 that contain configuration bits may be referred to as static CRAM 140. Static CRAM 140 may also be referred to as static configuration memory and/or static configuration registers. Remaining portions of CRAM 112 may be referred to as dynamic CRAM 142, and may be used for used for dynamic purposes (e.g., to store state information of a state machine). Dynamic CRAM 142 may serve as random-access memory for look-up tables (LUTs), and/or other storage elements. Some portions of dynamic CRAM 142 may be unused for circuit design 150.

Figure 2:
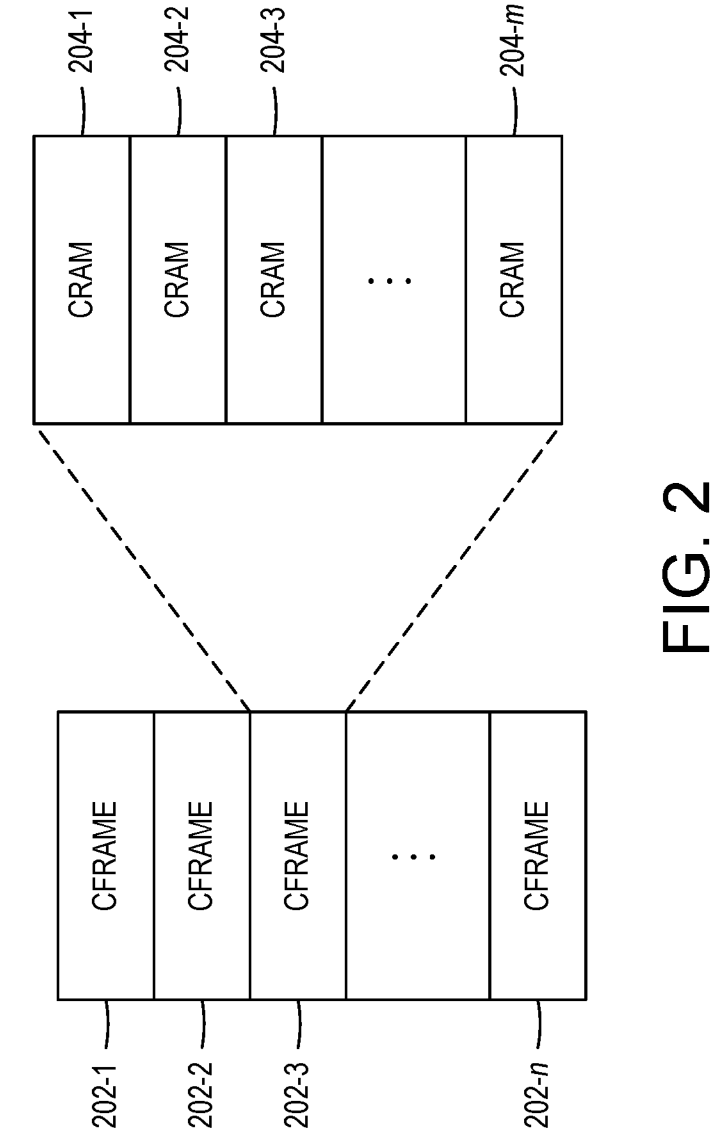
FIG. 2 illustrates the CRAM of the IC device, according to an embodiment.

FIG. 2 illustrates CRAM 112, according to an embodiment. In the example of FIG. 2, CRAM 112 is arranged or accessed as configuration frames (CFRAMEs) 202-1 through **202-*n* (collectively, CFRAMEs 202). A CFRAME 202 may represent a smallest addressable unit of CRAM 112. CFRAMEs 202 include respective CRAM. In the example of FIG. 2, CRFRAME 202-3 includes CRAM 204-1 through 204-*m*. CFRAMEs 202 may further include mask information and/or ECC bits. Configuration bits 118 of bitstream file 116 may be organized in corresponding frames (e.g., 32-bit words), and may include corresponding ECC bits. CRAM 112 is not limited to the example of FIG. 2**.

In FIG. 1, contents of static CRAM 140 are intended to remain static while IC device 102 is powered-up. As described further above, changes (i.e., bit-flips) may occur naturally/unintentionally due to environmental factors, and/or due to intentional/malicious actions. IC device 102 may further include scan logic 120 that detects changes in static CRAM 140. In an example, scan logic 120 has multiple modes of operation, including a Mode 1 and a Mode 2. Mode 1 may be referred to as a normal mode or an operating mode. Mode 2 may be referred to as an external CRAM challenge mode.

In Mode 1, scan logic 120 may scan/read contents of static CRAM 140, compare resultant scan data 160 to a golden copy (i.e., a known good copy) of configuration bits 118, and report a mismatch to management controller 114. Alternatively, scan logic 120 may compute a response code based on scan data 160 (e.g., using a hash function), compare the response code to a golden code of configuration bits 118, and report a mismatch to management controller 114.

In Mode 1, scan logic 120 may be precluded from considering contents of dynamic CRAM 142. In an example, scan logic 120 may issue a global readback command directed to all locations (e.g., CFRAMEs) of CRAM 112, and a global mask command that masks bits returned from dynamic CRAM 142. Scan logic 120 may ignore/disregard the masked bits, or may read the masked bits as all zeros or all ones. Where scan logic 120 reads the masked bits as all zeros or all ones, scan logic 120 may compute a response code based on bits read from static CRAM 140 and the all zeros or the all ones of the masked bits. In another example, scan logic 120 issues a readback command only to unmasked CRAM (i.e., static CRAM 140). Scan logic 120 may identify static CRAM 140 based on, for example, a list of masked frames contained in a mask file associated with bitstream file 116.

In the event of a mismatch between scan data 160 and the golden copy of configuration bits 118, scan logic 120 may further determine a location of corrupt data within static CRAM 140, and may report the location to management controller 114. Scan logic 120 may determine the location based on a direct comparison of scan data 160 and the golden copy of configuration bits 118. Alternatively, scan logic 120 and/or logic associated with CRAM 112 may compute error correcting codes (ECCs) for CFRAMEs of static CRAM 140, and corresponding frames of bitstream files 116 may include respective ECC words, which scan logic 120 may use for error detection in mode 1. Scan logic 120 and/or management controller 114 may further include scrubbing logic that corrects detected faults in static CRAM 140 (i.e., reloads the correct configuration bit(s) to the corrupted static CRAM 140).

Mode 1 may be susceptible to man-in-the-middle attacks, such as described further above. To reduce and/or eliminate the risk of man-in-the-middle attacks, IC device 102 may further include challenge logic 130 that interfaces between external challenger 100 and scan logic 120, as scan logic operates in Mode 2 (i.e., external CRAM challenge mode). In Mode 2, unused portions of dynamic CRAM 142 may serve as CRAM challenge registers loaded with challenge bits provided by external challenger 100, and scan logic 120 may scan static CRAM 140 and the challenge registers, such as described below with reference to FIGS. 3-7. Addresses of the CRAM challenge registers and the challenge bits may be access-protected within external challenger 100, within IC device 102, and/or in-transit between external challenger 100 and IC device 102. Absent knowledge of the addresses of the CRAM challenge registers and the challenge bits, a malicious actor cannot determine a valid challenge response to hide a change to any of the challenge bits stored in the CRAM challenge registers via a man-in-the-middle attack.

Figure 3:
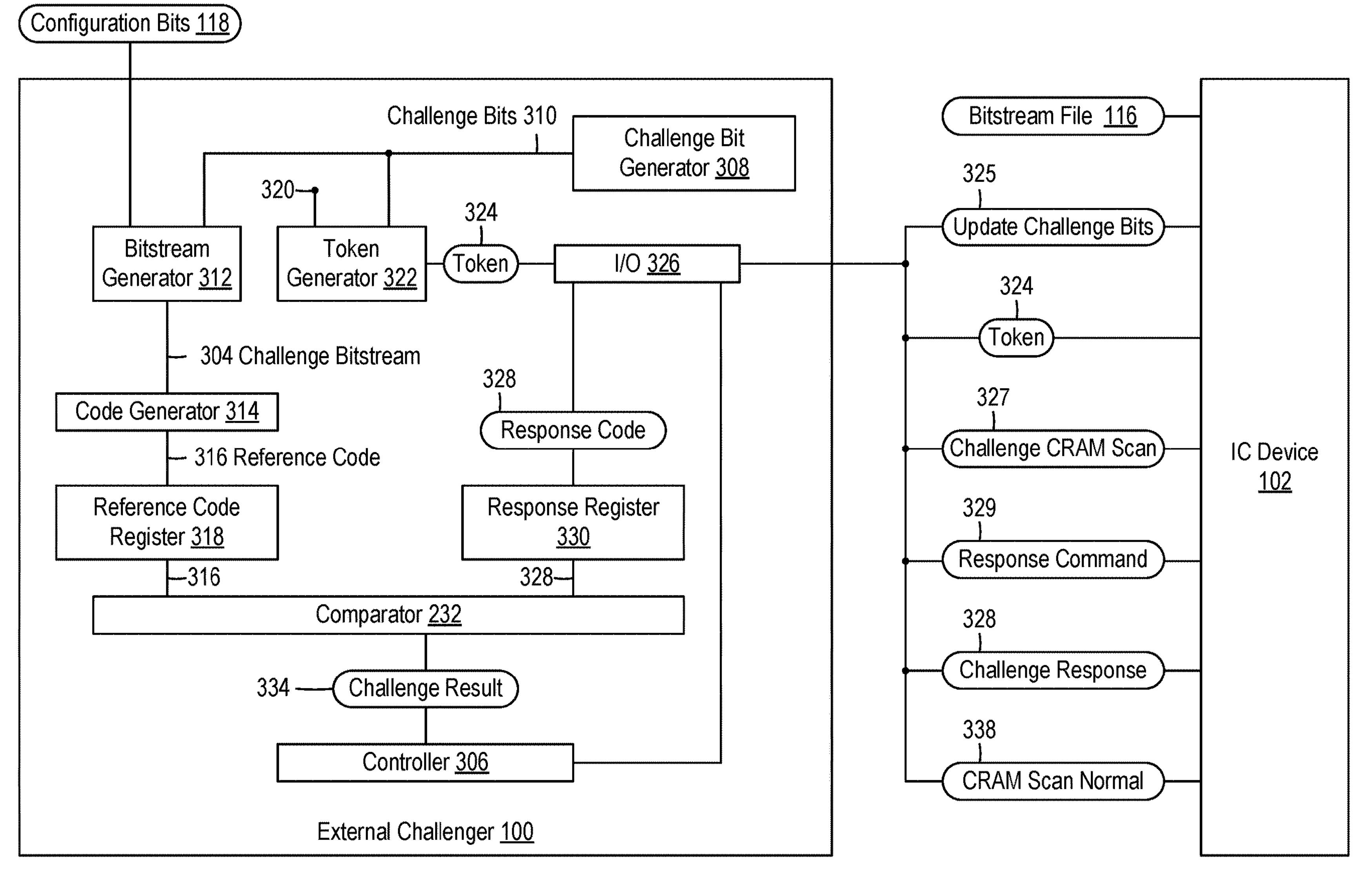
FIG. 3 is a block diagram of the external challenger, in which the external challenger provides a token containing challenge bits and CRAM addresses to the IC device, according to an embodiment.

FIG. 3 is a block diagram of external challenger 100, according to an embodiment. In the example of FIG. 3, external challenger 100 includes a controller 306 that selects unused locations/addresses 320 of dynamic CRAM 142 to serve as CRAM challenge registers. External challenger 100 further includes a challenge bit generator 308 that generates challenge bits 310 for addresses 320, and a challenge bitstream generator 312 that generates a challenge bitstream 304 based on challenge bits 310 and configuration bits 118. FIG. 3 is described further below with reference to FIG. 7.

Figure 4:
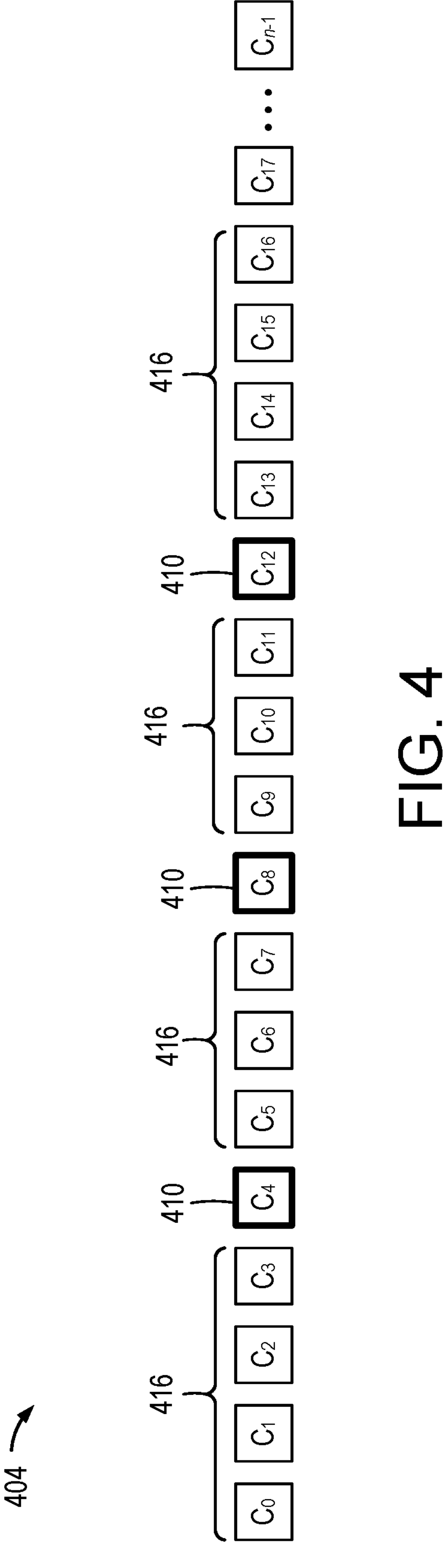
FIG. 4 illustrates a challenge bitstream generated by the external challenger, according to an embodiment.

FIG. 4 illustrates a challenge bitstream 404 that includes challenge bits 410, according to an embodiment. FIG. 4 is described further below with reference to FIG. 7.

Figure 5:
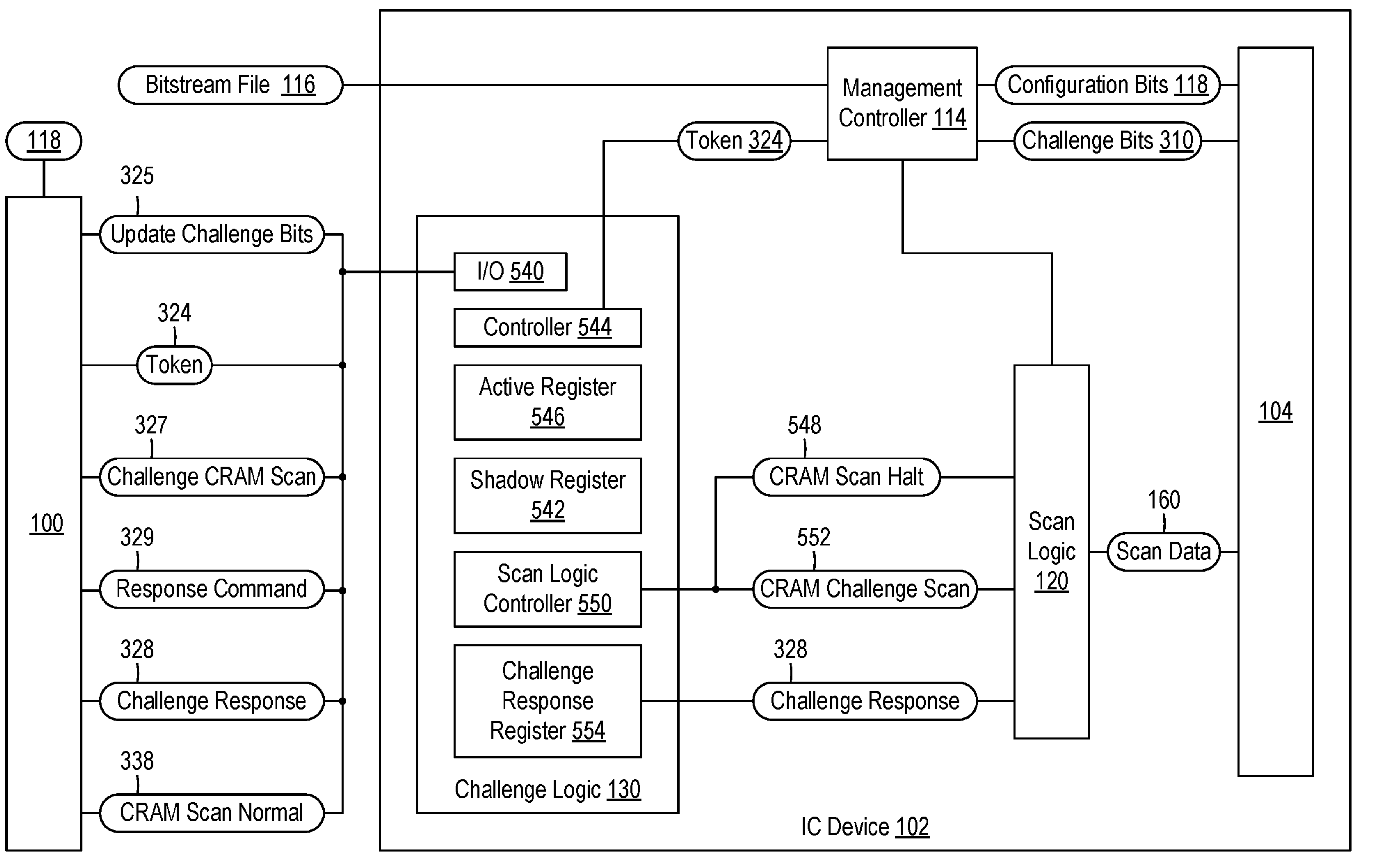
FIG. 5 is a block diagram of challenge logic of the IC device that receives the token and initiates storing of the challenge bits at the CRAM addresses, according to an embodiment.

FIG. 5 illustrates challenge logic 130, according to an embodiment. FIG. 5 is described further below with reference to FIG. 8.

Figure 6A:
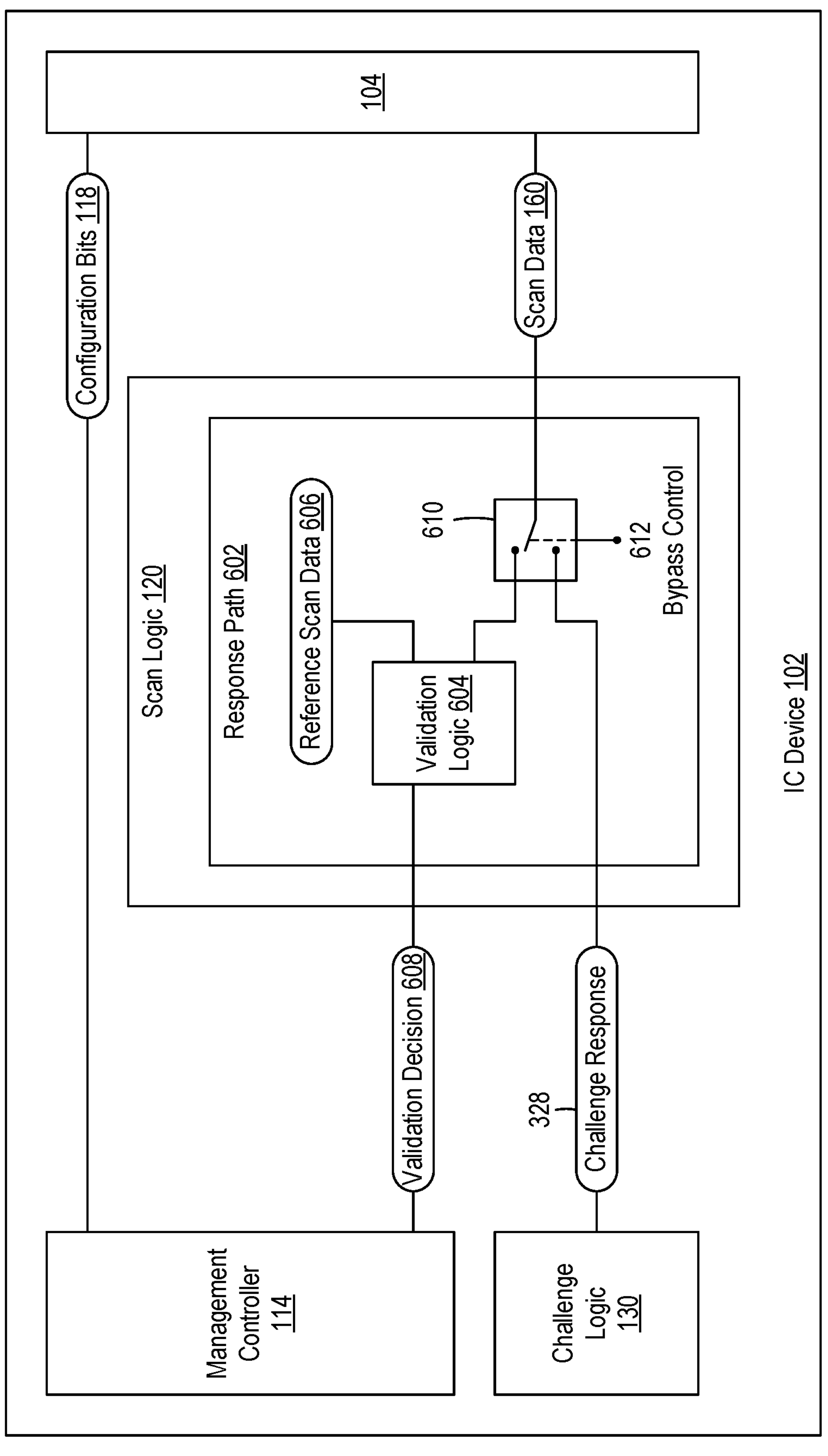
FIG. 6A illustrates a response path of scan logic of the IC device, according to an embodiment.

FIG. 6A illustrates a response path 602 of scan logic 120, according to an embodiment. In the example of FIG. 6A, response path 602 includes validation logic 604 that compares scan data 160 (i.e., contents of static CRAM 140) to reference scan data 606 and outputs a validation decision 608, in Mode 1. Reference scan data 606 may include a golden copy of configuration bits 118. Response path 602 further includes bypass circuitry 610 that bypasses validation logic 604 and outputs scan data 160 as challenge response 328, in Mode 2.

Figure 6B:
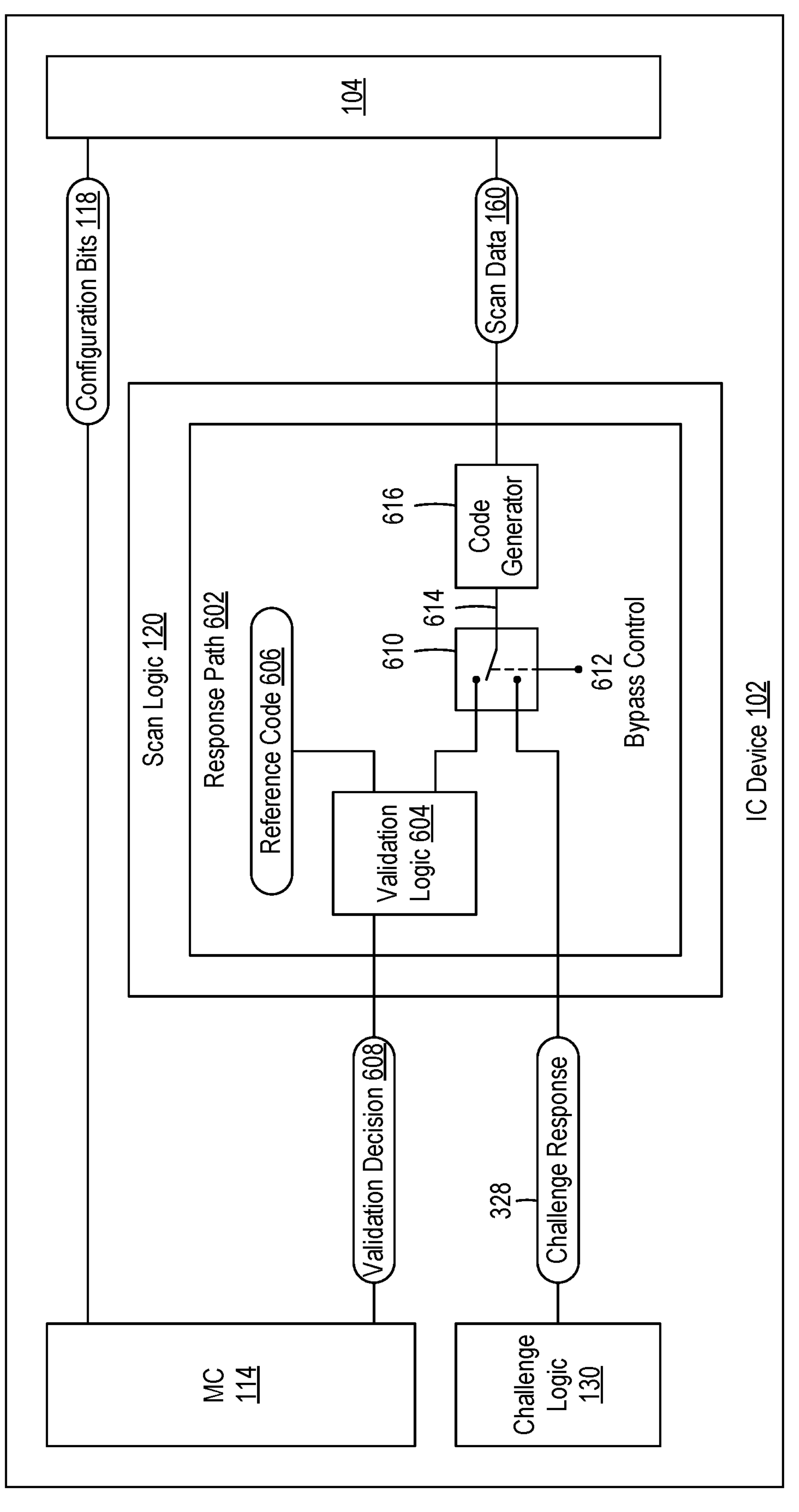
FIG. 6B illustrates the response path of the scan logic, further including a code generator, according to an embodiment.

FIG. 6B illustrates response path 602 of scan logic 120, further including a code generator 616, according to an embodiment. In this example, code generator 616 determines a response code 614 based on scan data 160, and validation logic 604 compares response code 614 to a reference code 606, in Mode 1. Reference code 606 may be based on the golden copy of configuration bits 118. In Mode 2, bypass circuitry 610 bypasses validation logic 604 and outputs response code 614 as challenge response 328.

Figure 7:
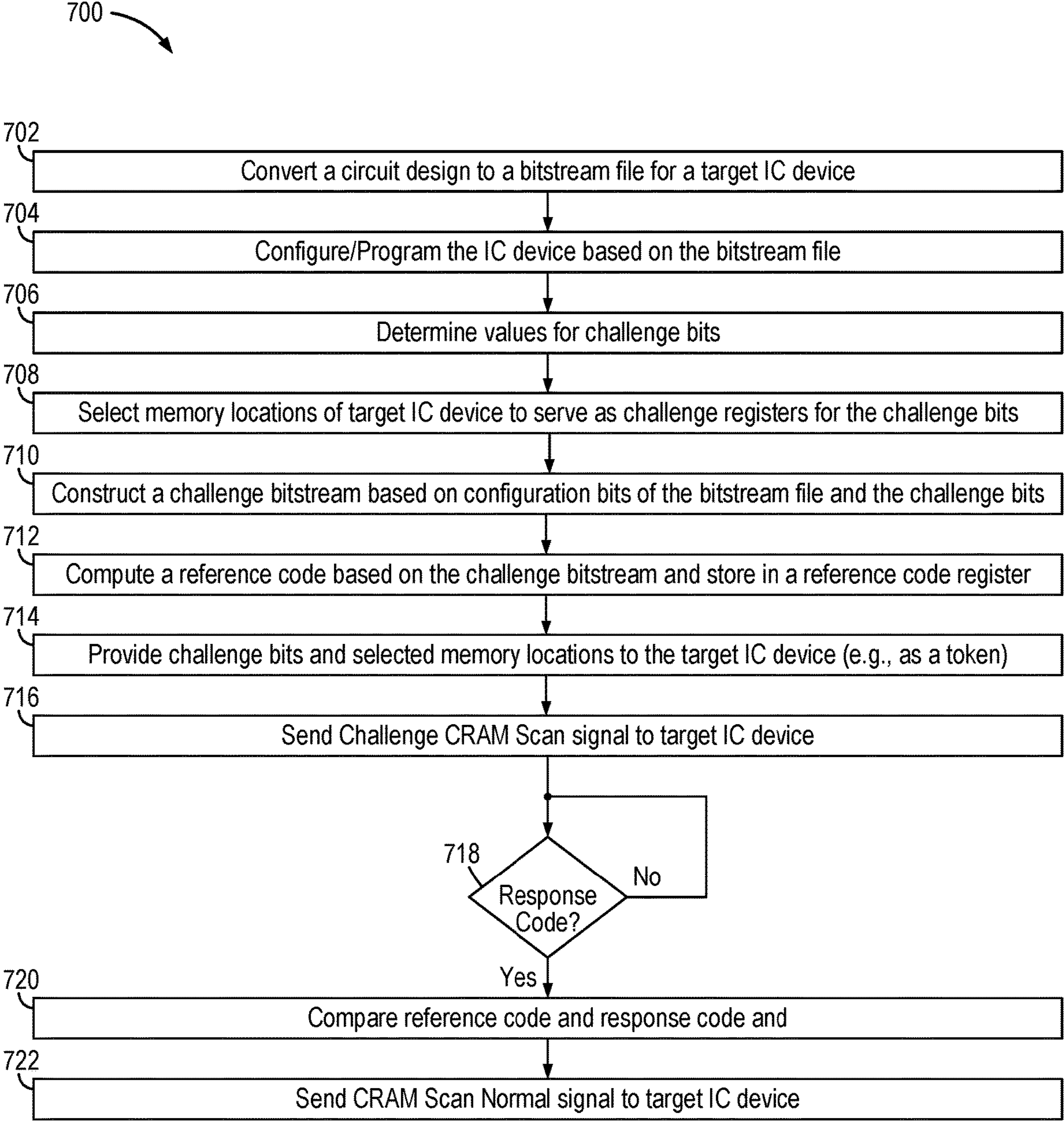
FIG. 7 illustrates a method of externally challenging an IC device to validate the configuration bits of the IC device, according to an embodiment.

FIG. 7 illustrates a method 700 of externally challenging of an IC device to validate configuration bits of the IC device, according to an embodiment. Method 700 is described below with reference to FIGS. 1 through 6B. Method 700 is not, however, limited to the examples of FIGS. 1 through 6B.

At 702, circuit design tool 152 converts circuit design 150 to bitstream file 116 based on elements of IC device 102.

Circuit design tool 152 may convert a netlist of circuit design 150 into a logic design, segment the logic design into sub-blocks, place and route the sub-blocks to logic blocks of programmable fabric 104 to produce a native circuit description, and convert the native circuit description to bitstream file 116 for IC device 102.

At 704, management controller 114 of IC device 102 programs/configures programmable fabric 104 based on bitstream file 116. As part of the configuration process, management controller 114 programs (i.e., writes) configuration bits 118 to static CRAM 140.

At 706, challenge bit generator 308 of external challenger 110 determines values for challenge bits 310 (e.g., a 32 bit challenge word). In an example, challenge bit generator 308 includes a random number generator (e.g., a pseudo-random number generator) that determines the values for challenge bits 310. In another example, challenge bit generator 308 selects one of multiple sets of pre-determined values (e.g., challenge words).

At 708, a controller 306 of external challenger 110 selects addresses 320 (e.g., CRFAME addresses) of CRAM 112 to serve as CRAM challenge registers for respective ones of challenge bits 310. Controller 306 may select addresses 320 from unused portions of CRAM 112. Controller 306 may select addresses 320 from unused portions of dynamic CRAM 142. In an example, controller 306 and/or other external tool identifies unused locations of CRAM 112 and/or dynamic CRAM 142 based on bitstream file 116, and controller 306 selects addresses 320 from the identified locations of CRAM 112 or dynamic CRAM 142. In another example, circuit design tool(s) 152 reserves a portion of CRAM 112 to serve as CRAM challenge registers when circuit design tool(s) 152 converts circuit design 150 to bitstream file 116, and controller 306 selects addresses 320 from the reserved portion of CRAM 112. External challenger 110 may select addresses 320 distributed throughout programmable fabric 104.

At 710, challenge bitstream generator 312 of external challenger 100 combines challenge bits 310 with configuration bits 118 (e.g., a golden copy of configuration bits 118), to provide challenge bitstream 304. Challenge bitstream generator 312 may receive a golden copy of configuration bits 118 from an internal/local storage device or from an external source (e.g., circuit design tool 152 or static CRAM 140). Alternatively, external challenger 100 and/or another tool may extract configuration bits 118 from bitstream file 116. Challenge bitstream generator 312 may arrange challenge bits 310 and configuration bits 118 based on corresponding destination locations/addresses (e.g., CFRAME addresses of static CRAM 140).

In FIG. 4, challenge bitstream 404 represents an example of challenge bitstream 304. Challenge bitstream 404 includes configuration bits 416, which represent an example of configuration bits 118, and challenge bits 410, which represent an example of challenge bits 310.

At 712, a code generator 314 of external challenger 100 computes a reference code 316 (e.g., a 32-bit codeword) based on challenge bitstream 304, and controller 306 stores reference code 316 in a reference code register 318. Code generator 314 may compute reference code 316 based on a hash function, such as a cyclic redundancy check (CRC) function. Code generator 314 may provide reference code 316 with parity protection. Alternatively, code generator 314 may be omitted and controller 306 may store challenge bitstream in reference code register 318.

At 714, external challenger 100 provides memory addresses 320 and challenge bits 310 to challenge logic 130 of IC device 102. In FIG. 3, a token generator 322 of external challenger 100 populates a data object, illustrated here as a token 324, with memory addresses 320 and challenge bits 310, and input/output logic (IO) 326 provides token 324 to challenge logic 130. A controller 306 of external challenger 100 may send an accompanying Update Challenge Bits signal 325 to challenge logic 130 to alert/instruct challenge logic 130 to retain memory addresses 320 and challenge bits 310 of token 324.

At 716, controller 306 sends a Challenge CRAM Scan signal 327 to instruct challenge logic 130 to initiate Mode 2 (i.e., external CRAM challenge mode) of Scan logic 120. Mode 2 is described further below with reference to FIG. 7.

At 718, external challenger 100 waits for a challenge response 328 and a Response Command 329 from challenge logic 130. Challenge response 328 may include raw scan data and/or a response code computed from raw scan data. When external challenger 100 receives challenge response 328 and Response Command 329, processing proceeds to 720.

At 720, based on Response Command 329, controller 306 stores challenge response 328 in a response register 330, and a comparator 332 of external challenger 100 compares contents of reference code register 318 to contents of response register 330, and outputs a challenge result 334 (e.g., pass/fail). In an example, reference code register contains reference code 316 and response register 330 contains a response code of challenge response 328. Alternatively, reference code register 318 contains challenge bitstream 304 and response register 330 contains raw scan response data of challenge response 328.

At 722, controller 306 may send a CRAM Scan Normal signal 338 to instruct challenge logic 130 to return scan logic 120 to Mode 1.

Figure 8:
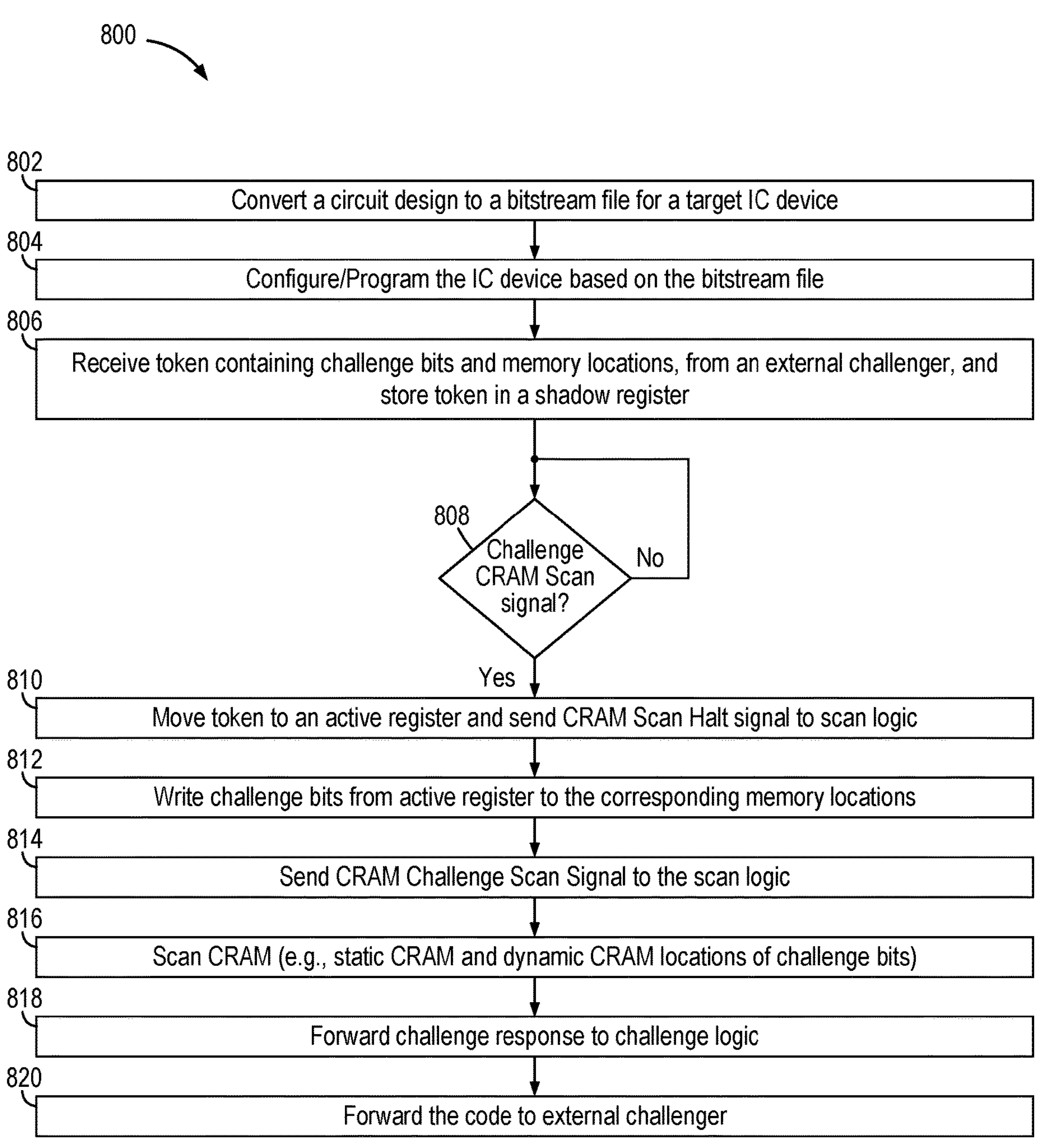
FIG. 8 illustrates a method of responding to an external challenge, by the IC device, according to an embodiment.

FIG. 8 illustrates a method 800 of responding to an external CRAM challenge, according to an embodiment. Method 800 is described below with reference to FIGS. 1 through 6B. Method 800 is not, however, limited to the example of FIGS. 1 through 5.

At 802, circuit design tool 152 converts circuit design 150 to bitstream file 116, such as described above with reference to 602 of method 600.

At 804, management controller 114 of IC device 102 programs/configures static programmable fabric 104 based on bitstream file 116, such as described above with reference to 604 of method 600.

At 806, challenge logic 130 receives Update Challenge Bits signal 325 and token 324 via input output logic (IO) 540, and a controller 544 of challenge logic 130 stores token 324 in a shadow register 542.

At 808, controller 544 waits for Challenge CRAM Scan signal 327. When controller 544 receives Challenge CRAM Scan signal 327, processing proceeds to 810.

At 810, controller 544 moves token 324 from shadow register 542 to an active register 546, and a scan logic controller 550 of challenge logic 130 sends a CRAM Scan Halt signal 548 to scan logic 120 to instruct scan logic 120 to halt any ongoing Mode 1 scan activities (i.e., validation based on scan data 160 and ECC). In FIGS. 6A and 6B, a bypass control 612 is set to bypass validation logic 604.

At 812, controller 544 initiates/invokes a procedure to write challenge bits 310 from active register 546 to corresponding addresses 320. In an example, controller 544 writes challenge bits 310 from active register 546 to corresponding addresses 320. In another example, controller 544 provides challenge bits 310 and locations 320 to management controller 114 or other logic of IC device 102, and management controller 114 writes challenge bits 310 to corresponding addresses 320.

At 814, scan logic controller 550 sends a CRAM Challenge Scan signal 552 to scan logic 120 to instruct scan logic 120 to scan CRAM 112. CRAM Challenge Scan signal 552 may also cause scan logic 120 to halt/skip internal processing (e.g., code comparisons). CRAM Challenge Scan signal 552 may serve as a signal for scan logic 120 to operate/scan in Mode 2.

At 816, scan logic 120 scans CRAM 112. In an example, scan logic 120 issues a global readback command directed to all of CRAM 112, and a global mask command that masks bits returned from dynamic CRAM 142, such as described further above with respect to Mode 1. Alternatively, controller 544 of challenge logic 130 may invoke a procedure that precludes the global mask command from masking bits of addresses 320, or that temporarily designates addresses 320 as static CRAM 140. In another example, scan logic 120 issues a readback command only to static CRAM 140 and to addresses 320 of dynamic CRAM 142. Scan logic 120 is not limited to the foregoing examples.

As described further above with reference to FIG. 6A, in Mode 1, validation logic 604 of scan logic 120 may compare scan data 160 to a golden copy of configuration bits 118 (i.e., reference scan data 606), and report results of the comparison (i.e., pass/fail validation decision 608). Alternatively, as illustrated in FIG. 6B, scan logic 120 may compute a response code 614 based on scan data 160, compare response code 614 to a reference code 606 computed from the golden copy of configuration bits 118, and report results of the comparison in validation decision 608. In Mode 2, however, the introduction of challenge bits 310 precludes scan data 160 from matching the golden copy of configuration bits 118 (i.e., reference scan data 606), and precludes response code 614 computed from scan data 160 from matching reference code 606 computed from the golden copy of configuration bits 118. Thus, at 818, scan logic 120 simply forwards scan data 160 or response code 614, as challenge response 328, to challenge logic 130. Scan logic 120 may compute the response code based on the hash function (e.g., a CRC) of code generator 314 in FIG. 3.

At 820, challenge logic 130 receives challenge response 328, stores challenge response 328 in a challenge response register 554, and forwards challenge response 328 from challenge response register 554 to external challenger 100 via IO 540. Controller 544 may send Response Command 329 prior to challenge response 328.

Addresses 320, challenge bits 310, and/or challenge response 328 may be access-protected within external challenger 100, within IC device 102, and/or in-transit between external challenger 100 and IC device 102. The access protections may include cryptographic (e.g., asymmetric/public and/or symmetric) and/or hardware based access-restrictions. Absent knowledge of addresses 320 and challenge bits 310, a malicious actor cannot determine and insert valid scan data 160 or a valid challenge response 328 to hide malicious changes to challenge bits 310 stored at addresses 320. Other communications between external challenger 100 and IC device 102 (e.g., commands/signals), and/or bitstream file 116 may also be access-protected. In an example, IC device 102 and external challenger 100 are provided with encrypted versions of bitstream file 116 (e.g., encrypted and signed, or signed with a shared key).

Figure 9:
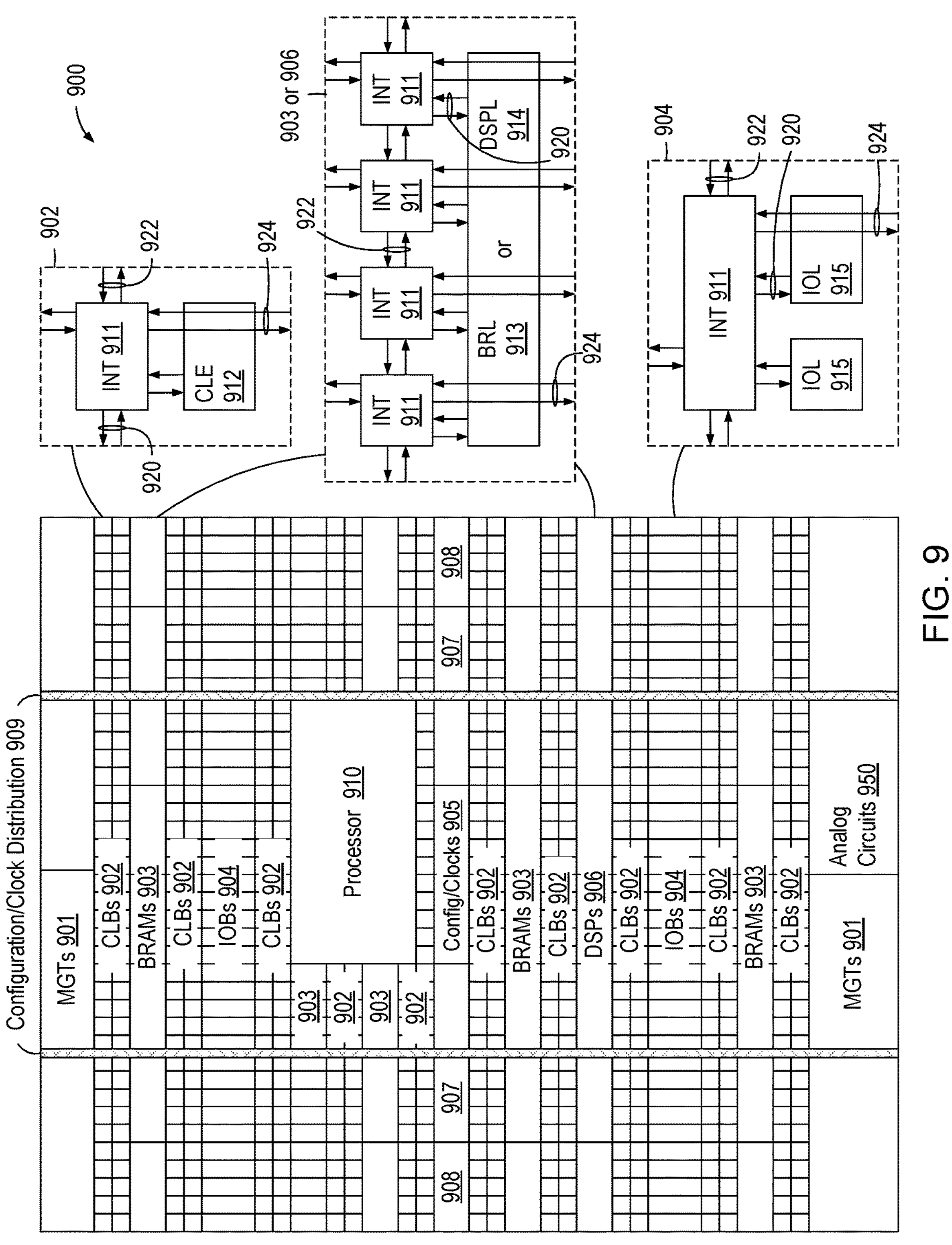
FIG. 9 is a block diagram of configurable circuitry, including an array of configurable or programmable circuit blocks or tiles, according to an embodiment.

Programmable fabric 104 may include one or more of a variety of types of configurable circuit blocks, such as described below with reference to FIG. 9. FIG. 9 is a block diagram of configurable circuitry 900, including an array of configurable or programmable circuit blocks or tiles, according to an embodiment. The example of FIG. 9 may represent a field programmable gate array (FPGA) and/or other IC device(s) that utilizes configurable interconnect structures for selectively coupling circuitry/logic elements, such as complex programmable logic devices (CPLDs).

In the example of FIG. 9, the tiles include multi-gigabit transceivers (MGTs) 901, configurable logic blocks (CLBs) 902, block random access memory (BRAM) 903, input/output blocks (IOBs) 904, configuration and clocking logic (Config/Clocks) 905, digital signal processing (DSP) blocks 906, specialized input/output blocks (I/O) 907 (e.g., configuration ports and clock ports), and other programmable logic 908, which may include, without limitation, digital clock managers, analog-to-digital converters, and/or system monitoring logic. The tiles further includes a dedicated processor 910.

One or more tiles may include a programmable interconnect element (INT) 911 having connections to input and output terminals 920 of a programmable logic element within the same tile and/or to one or more other tiles. A programmable INT 911 may include connections to interconnect segments 922 of another programmable INT 911 in the same tile and/or another tile(s). A programmable INT 911 may include connections to interconnect segments 924 of general routing resources between logic blocks (not shown). The general routing resources may include routing channels between logic blocks (not shown) including tracks of interconnect segments (e.g., interconnect segments 924) and switch blocks (not shown) for connecting interconnect segments. Interconnect segments of general routing resources (e.g., interconnect segments 924) may span one or more logic blocks. Programmable INTs 911, in combination with general routing resources, may represent a programmable interconnect structure.

A CLB 902 may include a configurable logic element (CLE) 912 that can be programmed to implement user logic. A CLB 902 may also include a programmable INT 911.

A BRAM 903 may include a BRAM logic element (BRL) 913 and one or more programmable INTs 911. A number of interconnect elements included in a tile may depends on a height of the tile. A BRAM 903 may, for example, have a height of five CLBs 902. Other numbers (e.g., four) may also be used.

A DSP block 906 may include a DSP logic element (DSPL) 914 in addition to one or more programmable INTs 911. An IOB 904 may include, for example, two instances of an input/output logic element (IOL) 915 in addition to one or more instances of a programmable INT 911. An I/O pad connected to, for example, an I/O logic element 915, is not necessarily confined to an area of the I/O logic element 915.

In the example of FIG. 9, config/clocks 905 may be used for configuration, clock, and/or other control logic. Vertical columns 909 may be used to distribute clocks and/or configuration signals.

A logic block (e.g., programmable of fixed-function) may disrupt a columnar structure of configurable circuitry 900. For example, processor 910 spans several columns of CLBs 902 and BRAMs 903. Processor 910 may include one or more of a variety of components such as, without limitation, a single microprocessor to a complete programmable processing system of microprocessor(s), memory controllers, and/or peripherals.

In FIG. 9, configurable circuitry 900 further includes analog circuits 950, which may include, without limitation, one or more analog switches, multiplexers, and/or de-multiplexers. Analog switches may be useful to reduce leakage current.

FIG. 9 is provided for illustrative purposes. Configurable circuitry 900 is not limited to numbers of logic blocks in a row, relative widths of the rows, numbers and orderings of rows, types of logic blocks included in the rows, relative sizes of the logic blocks, illustrated interconnect/logic implementations, or other example features of FIG. 9.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) device, comprising:

configuration random-access memory (CRAM);

circuitry that is configurable based on configuration bits stored in the CRAM;

scan circuitry configured to retrieve contents of the CRAM; and challenge circuitry configured to receive CRAM addresses and challenge bits from an external device, initiate storage of the challenge bits at respective ones of the CRAM addresses, invoke the scan circuitry to retrieve the contents of the CRAM, receive a challenge response from the scan circuitry, and provide the challenge response to the external device, wherein the challenge response comprises one or more of the retrieved contents of the CRAM and a response code;

wherein:

the scan circuitry is further configured to retrieve the contents of the CRAM by issuing a global scan command to the CRAM and a mask command that masks contents of CRAM addresses that are not used to store the configuration bits;

the CRAM addresses correspond to a subset of the CRAM addresses that are not used to store the configuration bits; and the challenge circuitry is further configured to override masking of contents of the CRAM addresses.

2. The IC device of claim 1, wherein the scan circuitry comprises:

validation circuitry configured to determine whether the retrieved contents of the CRAM match a reference version of the configuration bits and output a validation decision; and bypass circuitry configured to bypass the validation circuitry and output the challenge response to the challenge circuitry when the challenge circuitry invokes the scan circuitry;

wherein the challenge response comprises one or more of the retrieved contents of the CRAM and the response code.

3. The IC device of claim 2, wherein:

the validation circuitry is further configured to compare the retrieved contents of the CRAM to the reference version of the configuration bits; and the bypass circuitry is further configured to output the retrieved contents of the CRAM in the challenge response when the challenge circuitry invokes the scan circuitry.

4. The IC device of claim 2, wherein:

the scan circuitry further comprises a code generator configured to determine the response code based on the retrieved contents of the CRAM;

the validation circuitry is further configured to compare the response code to a reference code determined from the reference version of the configuration bits; and the bypass circuitry is further configured to output the response code in the challenge response when the challenge circuitry invokes the scan circuitry.

5. The IC device of claim 1, wherein the challenge circuitry comprises one or more of:

decryption circuitry configured to decrypt one or more of the CRAM addresses and the challenge bits; and encryption circuitry configured to encrypt the challenge response prior to providing the challenge response to the external device.

6. An integrated circuit (IC) device, comprising:

configuration random-access memory (CRAM);

circuitry and interconnects that are configurable based on configuration bits stored in the CRAM;

scan circuitry configured to retrieve contents of the CRAM; and challenge circuitry;

wherein the scan circuitry comprises validation circuitry configured to determine whether the retrieved contents of the CRAM match a reference version of the configuration bits and output a validation decision, in a first mode;

wherein the scan circuitry further comprises bypass circuitry configured to bypass the validation circuitry and output a challenge response in a second mode, wherein the challenge response comprises one or more of the retrieved contents of the CRAM and a response code determined based on the retrieved contents of the CRAM;

wherein the challenge circuitry is configured to receive CRAM addresses and challenge bits from an external device, initiate storage of the challenge bits at respective ones of the CRAM addresses, invoke the second mode of the scan circuitry, receive the challenge response from the scan circuitry, and provide the challenge response to the external device;

wherein the scan circuitry is further configured to retrieve the contents of the CRAM by issuing a global scan command to the CRAM and a mask command that masks contents of CRAM addresses that are not used to store the configuration bits;

wherein the CRAM addresses correspond to a subset of CRAM addresses that are not used to store the configuration bits; and wherein the challenge circuitry is further configured to override masking of contents of the CRAM addresses.

7. The IC device of claim 6, wherein:

the validation circuitry is further configured to compare the retrieved contents of the CRAM to the reference version of the configuration bits; and the bypass circuitry is further configured to output the retrieved contents of the CRAM in the challenge response in the second mode.

8. The IC device of claim 6, wherein:

the scan circuitry further comprises a code generator configured to determine the response code based on the retrieved contents of the CRAM;

the validation circuitry is further configured to compare the response code to a reference code determined from the reference version of the configuration bits; and the bypass circuitry is further configured to output the response code in the challenge response when the challenge circuitry in the second Mode.

9. The IC device of claim 6, wherein the challenge circuitry comprises one or more of:

decryption circuitry configured to decrypt one or more of the CRAM addresses and the challenge bits; and encryption circuitry configured to encrypt the challenge response prior to providing the challenge response to the external device.

10. An integrated circuit (IC) device, comprising:

programmable circuitry;

configuration random-access memory (CRAM) configured to store configuration bits for programming the programmable circuitry, wherein a first portion of the CRAM is reserved as static CRAM for storing configuration bits for a circuit design, and wherein a second portion of the CRAM is, that unused for the circuit design, and is reserved as dynamic CRAM for storing challenge bits;

challenge circuitry configured to receive addresses and the challenge bits from an external device, and to initiate storage of the challenge bits in the dynamic CRAM based on the addresses; and scan circuitry configured to:

retrieve contents of the static CRAM by issuing a global scan command to the CRAM and a mask command that masks contents of the dynamic CRAM; and compare the contents of the static CRAM to a reference version of the configuration bits and provide a validation decision to the challenge circuitry based on the comparison, in a first mode; and wherein the challenge circuitry is further configured to:

override the mask command to retrieve the contents of the static CRAM and contents of the dynamic CRAM; and provide the contents of the static CRAM and the dynamic CRAM to the challenge circuitry, in a second mode.

11. The IC device of claim 10, wherein the scan circuitry comprises:

validation circuitry configured to compare the contents of the static CRAM to the reference version of the configuration bits and provide the validation decision to the challenge circuitry based on the comparison, in the first mode; and bypass circuitry configured to bypass the validation circuitry in the second mode.

12. The IC device of claim 11, wherein:

the bypass circuitry is further configured to output the contents of the static CRAM and the dynamic CRAM when the challenge circuitry invokes the scan circuitry.

13. The IC device of claim 10, wherein the scan circuitry comprises:

a code generator configured to generate a first response code based on the contents of the static CRAM, in the first mode, and to generate a second response code based on the contents of the static CRAM and the dynamic CRAM, in the second mode;

validation circuitry configured to compare the first response code to a reference code determined from the reference version of the configuration bits, in the first mode; and bypass circuitry configured to provide the first response code to the validation circuitry in the first mode, and to provide the second response code to the challenge circuitry in the second mode.

14. The IC device of claim 10, wherein the challenge circuitry comprises one or more of:

decryption circuitry configured to decrypt one or more of the addresses and the challenge bits received from the external device; and encryption circuitry configured to encrypt the validation decision in the first mode, and to encrypt the contents of the static CRAM and the dynamic CRAM in the second mode.

* * * * *